United States Patent [19]
Helmer-Metzmann et al.

[11] Patent Number: 6,132,622
[45] Date of Patent: Oct. 17, 2000

[54] ABSORBENTS

[75] Inventors: Freddy Helmer-Metzmann, Essenheim; Alexandra Jacobs, Frankfurt, both of Germany

[73] Assignees: Ticona GmbH, Frankfurt, Germany; Mitsui Petrochemical Ind. Ltd., Japan

[21] Appl. No.: 09/096,773

[22] Filed: Jun. 12, 1998

Related U.S. Application Data

[62] Division of application No. 08/959,107, Oct. 23, 1997, which is a continuation of application No. 08/665,919, Jun. 19, 1996, abandoned.

[30] Foreign Application Priority Data

Jun. 19, 1995 [DE] Germany .......................... 195 21 561

[51] Int. Cl.[7] .................................................. B01D 15/00
[52] U.S. Cl. ........................................................... 210/693
[58] Field of Search ................................. 210/693, 242.4, 210/263, 924, 690, 692

[56] References Cited

U.S. PATENT DOCUMENTS

| | | | |
|---|---|---|---|
| 4,011,159 | 3/1977 | Stein et al. | 210/693 |
| 4,604,321 | 8/1986 | Okahara et al. | 428/319.9 |
| 4,935,475 | 6/1990 | Kishimura et al. | 526/169.2 |
| 5,049,633 | 9/1991 | Sasaki et al. | 526/281 |
| 5,071,564 | 12/1991 | Stein et al. | 210/693 |
| 5,091,492 | 2/1992 | Ishidoya et al. | 526/282 |
| 5,140,053 | 8/1992 | Yamamoto et al. | 521/142 |
| 5,179,171 | 1/1993 | Minami et al. | 525/288 |
| 5,304,331 | 4/1994 | Codiglia | 210/693 |
| 5,330,957 | 7/1994 | Duquenne | 210/693 |
| 5,428,098 | 6/1995 | Brekner et al. | 524/494 |
| 5,756,623 | 5/1998 | Kreuder et al. | 526/308 |

FOREIGN PATENT DOCUMENTS 0 524 674   1/1993   European Pat. Off. .

*Primary Examiner*—Ivars Cintins
*Attorney, Agent, or Firm*—Connolly Bove Lodge & Hutz LLP

[57] ABSTRACT

The present invention relates to an absorbent comprising at least one cycloolefin copolymer which contains polymerized units which are derived from at least one cyclic and at least one acyclic olefin.

19 Claims, No Drawings

ABSORBENTS

This application is a divisional of application Ser. No. 08/959,107, filed Oct. 23, 1997, which is a continuation of application Ser. No. 08/665,919, filed Jun. 19, 1996, now abandoned.

The present invention relates to absorbents which comprise cycloolefin copolymers (COC).

To eliminate contaminants of soil or waters with organic compounds which occasionally or constantly enter the environment, such as oils, complete absorption and disposal of these contaminants is necessary. Absorbents which absorb organic compounds selectively can be employed for this purpose. It is also necessary to use absorbents to eliminate contaminants, such as oils, which enter into liquids or gases during industrial process steps. Not only complete and ecologically acceptable removal of the contaminants but also rapid and easy separation with the minimum possible disturbance to the course of the process are important here.

It is known from the literature that polyolefins are suitable absorbents for absorbing oils on water surfaces (U.S. Pat. No. 3,770,627). DE 43 20 908 also describes the use of polyethylene for this application, this allowing the absorption of oil in a weight ratio of 1:3. This can be improved further by using fibrous polyethylene. Polypropylene powder and granules are likewise described as absorbents for hydrocarbons on water surfaces (JP 71 031 586, JP 56 005 176, EP 0 619 271). FR 2 288 709 describes the use of pulverulent polynorbornene for absorbing petrochemical products on solid and liquid surfaces. The invention includes the homopolymers of [2.2.1]bicycloheptene and also of 5-methyl-[2.2.1]bicyco-2-heptene, prepared by ring-opening polymerization.

On the basis of this invention, mixtures of homopolymers of [2.2.1]bicycloheptene and also of 5-methyl-[2.2.1] bicyclo-2-heptene with various organic and inorganic additives or fillers which are said to facilitate the absorption of contaminants, in particular oils, above all in waters, or to improve the ease of handling, have been described (FR 0 383 640, FR 0 383 641, U.S. Pat. No. 5,045,579).

JP 03 122 188 describes the preparation of absorbent films which consist of incomplete ring-opened [2.2.1] bicycloheptene and derivatives therof. These films are suitable for absorption of oils on water surfaces.

FR 2 645 047 describes the corresponding absorbent mixed with plasticizing additives and mineral fillers and pressed to a mat.

The use of absorbents in filter units for filtering out contaminants from liquids or high-pressure air is described in JP 4 118 013. A pulverulent or bead-shaped polynorbornene resin glued in layers onto a filter cloth, for example polyester, is used. Filter cassettes are built up from this, but cannot be reused directly.

Taking into account the amount of absorbent which is required for complete absorption of contaminants such as oils and is handled and after use is usually dumped or burned, it is desirable to achieve the maximum possible absorption capacity. It is furthermore important to optimize the ability of the absorbent to absorb contaminants permanently under stress, for example during absorption on surfaces during transportation or under pressure. This property is dealt with rarely and in little detail in the literature, but has a decisive influence on the efficiency of the absorbent.

In addition to the actual absorption capacity for contaminants such as oils, it is important for use in practice that the absorbent can be handled for absorption of contaminants on solid and liquid surfaces, i.e. can be applied readily and after contact with the contaminants can be taken up without difficulties. While handling of pulverulent binders on solid surfaces is unproblematic in many cases, their use, for example, on a turbulent water surface is difficult. An improvement in the ease of handling of the absorbent was achieved by the proposals described for solving this problem, for example by using films but here also the absorption capacity is still to be improved.

From the ecological standpoint, it is to be taken into account that combustion of systems of absorbents which comprise atoms other than carbon and hydrogen, for example elements of main groups III, IV, V, VI or VII, in particular nitrogen, phosphorus, oxygen, sulfur, fluorine, chlorine and bromine, is considerably more problematic than in the case of the pure polyolefins because of the by-products formed.

There was thus the object of providing an absorbent which avoids the disadvantages of the prior art. Surprisingly, it has been found that absorbents which comprise cycloolefin copolymers achieve this object.

The present invention relates to an absorbent comprising at least one cycloolefin copolymer which contains polymerized units which are derived from at least one cyclic, in particular polycyclic, olefin and at least one acyclic olefin.

The absorbent according to the invention comprises 10–100% by weight, preferably 50–100% by weight, particularly preferably 90–100% by weight, of one or more cycloolefin copolymers. The absorbent according to the invention can also essentially comprise only one or more cycloolefin copolymers. The polycyclic olefins preferably have 5 to 50, in particular 5 to 30, carbon atoms. The acyclic olefins are preferably α-olefines having 2 to 40 carbon atoms.

The content of polymerized units which are derived from cyclic, in particular polycyclic, olefins is 0.1 bis 99% by weight, preferably 30–99% by weight, particularly preferably 60–99% by weight, based on the total weight of the cycloolefin copolymer. The content of polymerized units which are derived from acyclic olefins is 0.1 to 99% by weight, preferably 5–80% by weight, particularly preferably 10–60% by weight, based on the total weight of the cycloolefin copolymer.

The invention preferably relates to absorbents comprising at least one cycloolefin copolymer which contains 0.1–99% by weight, preferably 30–99% by weight, particularly preferably 60–99% by weight based on the total weight of the cycloolefin copolymer, of polymerized units which are derived from one or more polycyclic olefins of the formulae I, II, III, IV, V or VI,

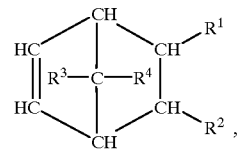

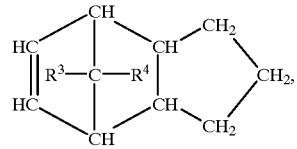

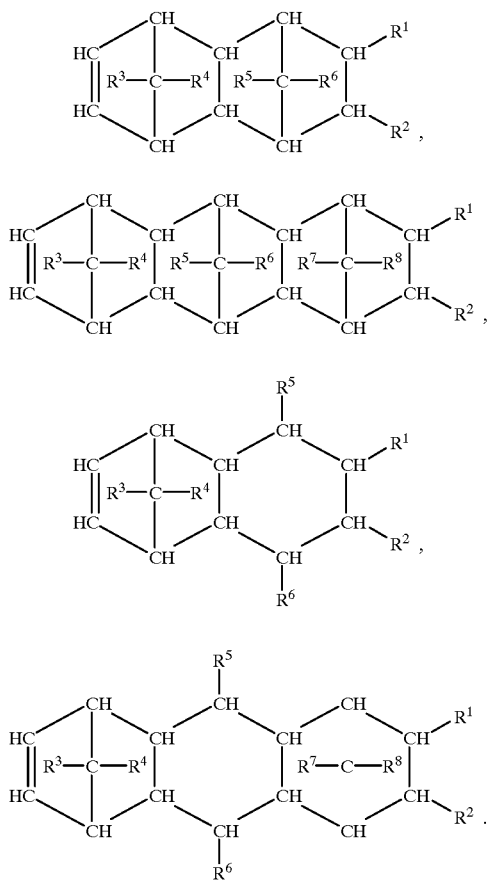

(III)

(IV)

(V)

(VI)

in which $R^1$, $R^2$, $R^3$, $R^4$, $R^5$, $R^6$, $R^7$ and $R^8$ are identical or different and are a hydrogen atom or a $C_1$–$C_{20}$-hydrocarbon radical, such as a linear or branched $C_1$–$C_8$-alkyl radical, a $C_6$–$C_{18}$-aryl radical, a $C_7$–$C_{20}$-alkylenearyl radical or a cyclic or acyclic $C_2$–$C_{20}$-alkenyl radical, or form a ring, where the same radicals $R^1$ to $R^8$ in the various formula I to VI can have a different meaning, and 0.1 to 99% by weight, based on the total weight of the cycloolefin copolymer, of polymerized units which are derived from one or more acyclic olefins of the formula VII

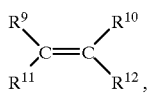

(VII)

in which $R^9$, $R^{10}$, $R^{11}$ and $R^{12}$ are identical or different and are a hydrogen atom or a $C_1$–$C_{20}$-hydrocarbon radical, such as a $C_1$–$C_8$-alkyl radical or a $C_6$–$C_{18}$-aryl radical.

The cycloolefin copolymer contained in the absorbent according to the invention can furthermore contain 0.1 to 95% by weight, based on the total weight of the cycloolefin copolymer, of polymerized units which are derived from one or more monocyclic olefins of the formula VIII

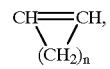

(VIII)

in which n is a number from 2 to 10.

The cycloolefin copolymers contained in the absorbent according to the invention preferably consist of polymerized units which are derived from one or more polycyclic olefins, in particular polycyclic olefins of the formulae I or III, and polymerized units which are derived from one or more acyclic olefins of the formula VII, in particular α-olefins having 2–20 carbon atoms. Cycloolefin copolymers which consist of polymerized units which are derived from a polycyclic olefin of the formula I or III and an acyclic olefin of the formula VII are particularly preferred. Terpolymers which consist of polymerized units which are derived from a polycyclic monoolefin of the formula I or III, an acyclic monoolefin of the formula VII and a cyclic or acyclic olefin which contains at least two double bonds (polyene), in particular cyclic, preferably polycyclic, dienes, such as norbornadiene, or cyclic, particularly preferably polycyclic, alkenes which carry a $C_2$–$C_{20}$-alkenyl radical, such as vinylnorbornene, are furthermore preferred.

The cycloolefin copolymers which are present in the absorbent according to the invention preferably comprise olefins having a norbornene base structure, particularly preferably norbornene, tetracyclododecene and, if appropriate, vinylnorbornene or norbornadiene. Cycloolefin copolymers which contain polymerized units which are derived from acyclic olefins having terminal double bonds, such as α-olefins having 2 to 20 C atoms, particularly preferably ethylene or propylene, are also preferred. Norbornene/ethylene and tetracyclododecene/ethylene copolymers are particularly preferred.

The terpolymers are particularly preferably norbornene/vinylnorbornene/ethylene, norbornene/norbornadiene/ethylene, tetracyclododecene/vinylnorbornene/ethylene or tetracyclododecene/vinyltetracyclododecene/ethylene terpolymers. The content of polymerized units which are derived from a polyene, preferably vinylnorbornene or norbornadiene, is 0–50% by weight, preferably 0–20% by weight, and the content of the acyclic monoolefin of the formula VII is 0.1 to 99% by weight, preferably 5–80% by weight, particularly preferably 10–60% by weight, based on the total weight of the cycloolefin copolymer. In the terpolymers described, the content of the polycyclic monoolefin is 0.1 to 99% by weight, preferably 20–95% by weight, particularly preferably 40–90% by weight, based on the total weight of the cycloolefin copolymer.

The terpolymers which comprise polymerized units which are derived from a polycyclic monoolefin, an acyclic monoolefin and a polyene can be crosslinked via the diolefinic unit during the polymerization reaction or after the polymerization reaction.

The cycloolefin copolymers which the absorbent according to the invention comprises can be prepared at temperatures from −78 to 200° C. under a pressure from 0.01 to 200 bar in the presence of one or more catalysts which comprise at least one transition metal compound and, if appropriate, a cocatalyst. Suitable transition metal compounds are metallocenes, in particular stereorigid metallocenes, and Ziegler catalysts based on titanium and vanadium. Examples of appropriate catalyst systems for the preparation of the cycloolefin copolymer which is suitable for the purposes of the invention are described, for example, in EP 203 799, EP 283 164, EP 407 870, EP 485 893, EP 503 422, DD 777 317, DD 231 070, which are expressly referred to here.

Examples of the transition metal compounds employed are:

rac-dimethylsilyl-bis-(1-indenyl)-zirconium dichloride,
rac-dimethylgermyl-bis-(1-indenyl)-zirconium dichloride,
rac-phenylmethylsilyl-bis-(1-indenyl)-zirconium dichloride,
rac-phenylvinylsilyl-bis-(1-indenyl)-zirconium dichloride,
1-silacyclobutyl-bis (1-indenyl)-zirconium dichloride,
rac-diphenylsilyl-bis-(1-indenyl)-hafnium dichloride,
rac-phenylmethylsilyl-bis-(1-indenyl)-hafnium dichloride,
rac-diphenylsilyl-bis-(1-indenyl)-zirconium dichloride,
rac-ethylene-1,2-bis-(1-indenyl)-zirconium dichloride,
dimethylsilyl-(9-fluorenyl)-(cyclopentadienyl)-zirconium dichloride,
diphenylsilyl-(9-fluorenyl)-(cyclopentadienyl)-zirconium dichloride,
bis(1-indenyl)-zirconium dichloride,
diphenylmethylene-(9-fluorenyl)-cyclopentadienyl-zirconium dichloride,
isopropylene-(9-fluorenyl)-cyclopentadienyl-zirconium dichloride,
phenylmethylmethylene-(9-fluorenyl)-cyclopentadienyl-zirconium dichloride,
isopropylene-(9-fluorenyl)-(1-(3-isopropyl)cyclopentadienyl)-zirconium dichloride,
isopropylene-(9-fluorenyl)(1-(3-methyl)cyclopentadienyl)-zirconium dichloride,
diphenylmethylene-(9-fluorenyl)(1-(3-methyl)cyclopentadienyl)-zirconium dichloride,
methylphenylmethylene-(9-fluorenyl)(1-(3-methyl)cyclopentadienyl)-zirconium dichloride,
dimethylsilyl-(9-fluorenyl)(1-(3-methyl)-cyclopentadienyl)-zirconium dichloride,
diphenylsilyl-(9-fluorenyl)(1-(3-methyl)cyclopentadienyl)-zirconium dichloride,
diphenylmethylene-(9-fluorenyl)(1-(3-tert.-butyl)cyclopentadienyl)-zirconium dichloride,
isopropylene-(9-fluorenyl)(1-(3-tert.-butyl)cyclopentadienyl)-zirconium dichloride,
isopropylene-(cyclopentadienyl)-(1-indenyl)-zirconium dichloride,
diphenylcarbonyl-(cyclopentadienyl)-(1-indenyl)-zirconium dichloride,
dimethylsilyl-(cyclopentadienyl)-(1-indenyl)-zirconium dichloride,
isopropylene-(methylcyclopentadienyl)-(1-indenyl)-zirconium dichloride,
4-($\eta^5$-cyclopentadienyl)-4,7,7-trimethyl-($\eta^5$-4,5,6,7-tetrahydroindenyl)-zirconium dichloride and analogous hafnocenes,
titanium tetrachloride, $VOCl_3$, $VOCl_2(OCH_3)$, $VOCl_2(OC_2H_5)$ and $VOCl(OC_2H_5)_2$.

The absorbent according to the invention shows particularly good absorption properties if the cycloolefin copolymers it comprises have a glass transition temperature of between 50 and 300° C., preferably a glass transition temperature of between 100 and 250° C. The glass transition temperatures are determined by means of DSC (Differential Scanning Calorimetry) at a heating-up rate of 20° C./minute.

The cycloolefin copolymers which are particularly suitable for the purposes of the invention have viscosity numbers of between 50 and 300 cm$^3$/g, in particular between 60 and 200 cm$^3$/g. The viscosity numbers are determined in decalin at 135° C. in accordance with DIN 53 728.

The absorbents according to the invention have outstanding properties in respect of absorption and permanent binding of contaminants. The contaminants include organic compounds, such as oils, i.e. water-insoluble organic compounds which are liquid at room temperature and have a relatively low vapor pressure. Examples of these are mineral oils from petroleum, completely synthetic oils, such as silicone oils, vegetable and animal oils, such as triglycerides of medium-chain or unsaturated fatty acids, essential oils, such as fragrant, volatile oils, and aromatic substances from plants. Mineral oils include hydrocarbons having 1 to 100 carbon atoms, such as branched or unbranched alkanes having 1 to 40 carbon atoms and cycloalkanes having 5 to 50 carbon atoms, each of which can carry $C_1$–$C_{100}$-hydrocarbon substituents, branched and unbranched alkenes having 1 to 40 carbon atoms and aromatics having 6 to 50 carbon atoms, each of which can carry $C_1$–$C_{100}$-hydrocarbon substituents. The contaminants such as oils cain contain atoms other than carbon and hydrogen, in particular oxygen, sulfur and nitrogen. The contaminants likewise include substituted derivatives of the hydrocarbons mentioned, where the substituents can contain atoms other than carbon and hydrogen, for example elements of main groups III, IV, V, VI or VII of the Periodic Table of the Elements, in particular nitrogen, phosphorus, oxygen, sulfur, fluorine, chlorine and bromine.

The cycloolefin copolymer which the absorbent according to the invention comprises can have various morphologies. By choosing suitable working up steps and working up conditions, for example, very fine flakes or fibrous materials of the cycloolefin copolymer, which are distinguished by a high surface area and a low bulk density of less than 300 g/l, preferably 5 to 150 g/l, particularly preferably 5 to 50 g/l, can be obtained. Such absorbents show a very good wettability by contaminants and outstanding absorption properties.

The preparation of larger, for example bead-shaped, particles of the cycloolefin copolymer is also possible under suitable working up conditions. To achieve the maximum possible surface area, porous particles can also be prepared.

The cycloolefin copolymer can be worked up directly from the polymerization solution or from the solution of previously isolated cycloolefin copolymer powder or granules. Preferably, the cycloolefin copolymer is obtained by precipitation of the dissolved cycloolefin copolymer in a precipitating agent or by evaporation of the solvent. Particularly preferably, solutions which comprise the particular cycloolefin copolymer are sprayed into a precipitating agent or a gas space or are added dropwise to the precipitating agent. By choosing suitable working up conditions, cycloolefin copolymers of different structure and bulk density, or larger beads of different porosities, can be obtained.

The porosity can furthermore be influenced by addition of compounds which are bonded to the cycloolefin copolymer by physical interactions or chemically and are poorly soluble or insoluble in the precipitating agent. If these additives are then dissolved out of the cycloolefin copolymers, for example by addition of a solvent in which, however, the cycloolefin copolymer is insoluble, additional or larger pores can be produced in the polymer. Particles having an average diameter of 0.5 to 5 mm are preferably prepared.

Larger porous particles of cycloolefin copolymers can furthermore be obtained by agglomeration. Preferably, the absorbent according to the invention comprises a pulverulent or flake-like cycloolefin copolymer of low bulk density. The cycloolefin copolymer can be swollen slightly with a low-boiling poor solvent and agglomerated, for example by rotation in a tumble mixer. The swelling agent can be evaporated off by gentle heating or in vacuo and recovered by condensation. Particles having a particle size of 0.5 to 5 mm are preferably prepared.

Starting from dissolved or undissolved absorbent which comprises the particular cycloolefin copolymer, preferably one which has been prepared by precipitation, spray precipitation or spray drying, cohesive absorbent systems, such as, for example, mats, can be produced as the specific use form of the absorbent. Such absorbent systems which, because of a porous structure, have a large surface area, i.e. the large surface area of the precipitated polymer is retained, are preferred. To increase the mechanical stability, these absorbent systems can be applied to a carrier, for example of cycloolefin copolymer or of rubber.

Another specific use form of the absorbent is the production of thin porous layers. In this case, starting from a solution of the cycloolefin copolymer which the absorbent according to the invention comprises, a thin porous layer which, because of its large surface area, shows good absorption properties can be produced, for example, by spreading the solution to a thin film and then precipitating the copolymer by evaporation of the solvent or in a precipitating agent. This porous layer can also be coated with suitable materials and, to increase the mechanical stability, applied to a support, for example of cycloolefin copolymer or of rubber.

The use of larger, for example pulverulent, particles of the absorbent or the use of absorbent systems such as mats and porous layers facilitates the ease of handling of the absorbent on surfaces, in particular on turbulent aqueous surfaces.

The absorbent according to the invention can furthermore be used for removing contaminants from liquids and gases flowing past or through, for example in the context of an industrial process. For this purpose, the absorbent according to the invention can be incorporated, for example, into a filter unit in order thus to ensure discontinuous or continuous removal of contaminants such as oils in a simple process step. Larger particles of the cycloolefin copolymer having an average diameter of 0.5 to 5 mm are preferably used. These are preferably employed in the form of a loose bulk material, for example in a cylindrical, possibly transparent container, for purifying liquids and gases flowing through.

Porous layers of cycloolefin copolymers can likewise be used for removal of contaminants from liquids and gases flowing past or through, for example in the context of a process. Thin porous layers, in particular those having a layer thickness of less than 2 mm, are preferred for purification of liquids and gases flowing through. These systems can be incorporated as absorbents, for example, into a filter unit in order thus to ensure discontinuous or continuous removal of contaminants such as, for example, oils in a simple process step. Preferably, one or more thin porous layers are used and are employed, for example, in a cylindrical, possibly transparent container. The layers can be fixed mechanically, for example, or be applied to a carrier, preferably a coarse-meshed system, for example of metal, polymer or synthetic or naturally occurring fibers, for fixing and simultaneously increasing the mechanical stability.

The cycloolefin copolymer which the absorbent according to the invention comprises can be prepared in various structures and bulk densities, for example as flakes or beads, by slow dropwise addition of a solution which comprises 0.1 to 30% by weight of the polymer in a solvent, into a precipitating agent at a rate of 0.001 to 100 l/h, while stirring. Solvents are, for example, aromatics and substituted aromatics, such as benzene, toluene, xylene, aliphatic and cyclic hydrocarbons and substituted derivatives thereof, such as hexane, cyclohexane and cyclopentane, where the substituents can contain atoms other than carbon and hydrogen, for example elements of main groups II, IV, V, VI or VII, in particular nitrogen, phosphorus, oxygen, sulfur, fluorine, chlorine or bromine, and mixtures of these solvents. Solvents which are preferably used are: toluene, hexane, cyclohexane and cyclopentane. Preferred precipitating agents are polar media, such as water, acetone or lower alcohols, such as methanol or ethanol, or mixtures of these precipitating agents. The temperature of the solution and also of the precipitating agent is in a range from 10° to 100° C., and in the case of the solution is preferably 10° to 30° C. Acetone, methanol and ethanol and their mixtures are likewise preferably used as the precipitating agent at 10° to 30° C., and in particular in a ratio of the volume of the solvent to the volume of the precipitating agent of about 1:1 to 1:20. Water is preferably used as the precipitating agent at 85° to 100° C. particularly preferably at 92° to 98° C., in order to distill off low-boiling solvents, for example hexane, cyclohexane and cyclopentane, directly and higher-boiling solvents, for example toluene, azeotropically. The ratio of the volume of the solvent to the volume of the precipitating agent here is about 1:5 to 1:20. The solvent evaporated off is condensed and, for example, separated in a water separator from water which has likewise been distilled off and condensed, and is recovered in this way. The entire process can be carried out either discontinuously or continuously.

The adjustment of the particle size of the flakes or beads and therefore also of the surface area can be influenced by the rate of dropwise addition and stirring speed, which is 10 to 3000 revolutions/minute. Pulverulent and flake-like polymers or also fibrous polymers having bulk densities of between 5 and 300 g/l or bead-shaped particles having an average diameter of 0.5 to 5 mm have been produced in this manner.

The cycloolefin copolymer which the absorbent according to the invention comprises can likewise be worked up by spraying 0.01 to 100 l/hour of a solution comprising 0.1 to 30% by weight of the polymer in a solvent into a precipitating agent. Solvents are, for example, aromatics and substituted aromatics, such as benzene, toluene or xylene, aliphatic and cyclic hydrocarbons and substituted derivatives thereof, such as hexane, cyclohexane or cyclopentane, where the substituents can contain atoms other than carbon and hydrogen, for example elements of main groups III, IV, V, VI or VII, in particular nitrogen, phosphorus, oxygen, sulfur, fluorine, chlorine or bromine, and mixtures of these solvents. Solvents which are preferably used are: toluene, hexane, cyclohexane and cyclopentane. Preferred precipitating agents are polar media, such as water, acetone or lower alcohols, such as methanol or ethanol, or mixtures of these precipitating agents. The temperature of the solution and also of the precipitating agent is in a range from 10 to 100° C., and in the case of the solution is preferably 10 to 30° C. Acetone, methanol and ethanol and their mixtures are likewise preferably used as the precipitating agent at 10 to 30° C., and in particular in a ratio of the volume of the solvent to the volume of the precipitating agent of about 1:1 to 1:50. Water is preferably used as the precipitating agent at 85 to 100° C., most preferably at 92 to 98° C., in order to distill off low-boiling solvents, for example hexane, cyclohexane and cyclopentane, directly and higher-boiling solvents, for example toluene, azeotropically. The ratio of the volume of the solvent to the volume of the precipitating agent is about 1:1 to 1:50. The solvent evaporated off is condensed and, for example, separated in a water separator from water which has likewise been distilled off and condensed, and is recovered in this way. The entire process can be carried out either discontinuously or continuously.

Adjustment of the particle size of the flakes or beads and therefore also of the surface area is influenced by the different spraying-in rate. During spraying in, it is necessary to stir the liquid vigorously or to keep it under vigorous agitation by passing in finely divided inert gas, for example nitrogen or argon. Agglutination of precipitating particles is more or less prevented and the particle size of the material influenced in this manner. Pulverulent and flake-like polymers or else fibrous polymers having bulk densities of between 5 and 300 g/l or bead-shaped particles having an average diameter of 0.5 to 5 mm have been produced. The cycloolefin copolymer which the absorbent according to the invention comprises can likewise be prepared in a different structure and bulk density by spraying 0.01 to 100 l/hour of a solution comprising 0.1 to 30% by weight of the polymer in a solvent into a heated space filled with a gas, preferably with an inert gas, in particular nitrogen or argon. Solvents are, for example, aromatics and substituted aromatics, such as benzene, toluene and xylene, aliphatic and cyclic hydrocarbons and substituted derivatives thereof, such as hexane, cyclohexane or cyclopentane, where the substituents can contain atoms other than carbon and hydrogen, for example elements of main groups III, IV, V, VI or VII, in particular nitrogen, phosphorus, oxygen, sulfur, fluorine, chlorine or bromine, and mixtures of these solvents. Solvents which are preferably used are low-boiling liquids, for example hexane, cyclohexane or cyclopentane. The solvent is evaporated within a short time by heating the gas space to a constant temperature, which can be in the range from 40 to 300° C., preferably at 40 to 150° C., particularly preferably at 60 to 120° C. A continuous stream of gas ensures vigorous agitation of the precipitating polymer and thus prevents agglutination during evaporation of the solvent. Furthermore, the solvent vapor is removed from the gas space by this means, and can be condensed and re-used. The entire process can be carried out either continuously or discontinuously.

Adjustment of the particle size of the flakes or beads and therefore also of the surface area is influenced by the different spraying-in rate. During spraying in, it is necessary for the precipitating polymer to be kept under vigorous agitation by passing in finely divided inert gas, for example nitrogen or argon. Agglutination of precipitating particles is more or less prevented and the particle size of the material influenced in this manner. Pulverulent and flake-like polymers, or else fibrous polymers, have been obtained with bulk densities of between 5 and 300 g/l or bead-shaped particles having a particle size of 0.5 to 5 mm have been produced in this manner.

For agglomeration of the absorbent, the resulting cycloolefin copolymer is employed in the form of a solid material, in particular a material of low bulk density, which has preferably been prepared by precipitation, spray precipitation or spray drying. This can be superficially dissolved or swollen by small amounts of a solvent, preferably a poor solvent. Solvents are, for example, aromatics and substituted aromatics, such as benzene, toluene and xylene, aliphatic and cyclic hydrocarbons and substituted derivatives thereof, such as hexane, cyclohexane and cyclopentane, where for the substituents can contain atoms other than carbon and hydrogen, for example elements of main groups III, IV, V, VI or VII, in particular nitrogen, phosphorus, oxygen, sulfur, fluorine, chlorine or bromine, and mixtures of these solvents. Low-boiling solvents, preferably having a boiling point below 100° C., are particularly suitable. Agglomeration of the absorbent which comprises the superficially dissolved or swollen polymer is effected, for example, by rotation, for example in a shallow, cylindrical vessel. The swelling agent can be evaporated by gentle heating or in vacuo and recovered by condensation. Particles of the absorbent which have a stable porous structure after evaporation of the swelling agent are obtained in this manner. Average diameters of the particles of 0.5 to 15 mm are achieved, and particles having an average diameter of 0.5 to 5 mm are preferred.

Cohesive absorbent systems such as mats can be produced starting from the dissolved or undissolved cycloolefin copolymer. Those systems in which, because of a porous structure, a large surface area is obtained or the large surface area of the precipitated polymer is retained are preferred. Various continuous and discontinuous methods can be used for production of cohesive systems. Preferably, solid material, particularly preferably that which comprises the pulverulent and flake-like cycloolefin copolymer, which can be obtained by precipitation, spray precipitation or spray drying, is brought into the desired use form by pressing at various pressures and temperatures. Pressures of 2 to 50 bar and temperatures of 20 to 200° C. are used, and conditions of 5 to 30 bar and temperatures which are about 20° C. below the glass transition temperature of the particular cycloolefin copolymer are preferred. On the basis of these conditions and by using presses which do not have a smooth surface but on which preferably one or both surfaces are made of an uneven, for example rough or grid-like, material, it is possible to obtain absorbent systems such as mats which have a large surface area or in which the large surface area of the resulting pulverulent or flake-like cycloolefin copolymer is retained. The thickness of these absorbent systems is between 0.1 and 15 cm, preferably between 1 and 10 cm. To increase the mechanical stability, they can be applied to a carrier, for example of cycloolefin copolymer or of rubber.

Corresponding cohesive absorbent systems can also be produced by a procedure in which solid material, preferably that which comprises the pulverulent and flake-like cycloolefin copolymer, which can be obtained by precipitation, spray precipitation or spray drying, is superficially dissolved or swollen by small amounts of a solvent, preferably a poor solvent. Solvents are, for example, aromatics and substituted aromatics, such as benzene, toluene and xylene, aliphatic and cyclic hydrocarbons and substituted derivatives thereof, such as hexane, cyclohexane and cyclopentane, where the substituents can contain atoms other than carbon and hydrogen, for example elements of main groups III, IV, V, VI or VII, in particular nitrogen, phosphorus, oxygen, sulfur, fluorine, chlorine or bromine, and mixtures of these solvents. Low-boiling solvents, preferably having a boiling point below 100° C., are particularly suitable. The superficially swollen or dissolved absorbent is brought into the desired use form in a continuous or discontinuous process by pressing at various pressures and temperatures. Pressures of 2 to 50 bar and temperatures of 20 to 200° C. have been used, and conditions of 5 to 30 bar and temperatures of between 20 and 80° C., particularly preferably between 20 and 50° C., are preferred. On the basis of these conditions and by using presses which do not have a smooth surface but on which preferably one or both surfaces are made of an uneven, for example rough or grid-like, material, it is possible to obtain absorbent systems such as mats which have a large surface area or in which the large surface area of the pulverulent or flake-like cycloolefin copolymer employed is retained. The swelling agent can be evaporated off during the pressing operation or thereafter by means of temperatures which are above the boiling point of the swelling agent, and the evaporation operation can be assisted by applying a vacuum. An even greater surface area of the systems can be obtained in this manner. The thickness of these absorbent systems is between 0.1 and 15 cm, preferably between 1 and 10 cm. To increase the mechanical stability, they can be applied to a carrier, for example likewise of cycloolefin copolymer or or rubber.

Thin layers of the absorbent according to the invention, preferably thin porous layers which can be used, in particular, for removing contaminants from liquids and gases flowing through, for example in the context of a process, i.e. those having a layer thickness of less than 5 mm, in particular those having a layer thickness of less than 2 mm, can be produced by application of a thin layer of a solution of the cycloolefin copolymer which the absorbent according to the invention comprises onto a surface in a continuous or a discontinuous process. The solvent can be evaporated here by higher temperature, vacuum or a combination of higher temperature and vacuum. Application of a thin layer of a polymer solution to the surface of a precipitating agent in a continuous or a discontinuous process is preferred. Solvents are, for example, aromatics and substituted aromatics, such as benzene, toluene and xylene, aliphatic and cyclic hydrocarbons and substituted derivatives thereof, such as hexane, cyclohexane and cyclopentane, where the substituents can contain atoms other than carbon and hydrogen, for example elements of main groups III, IV, V, VI or VII, in particular nitrogen, phosphorus, oxygen, sulfur, fluorine, chlorine or bromine, and mixtures of these solvents. Preferred solvents here are toluene, hexane, cyclohexane, cyclopentane and tetrahydrofuran. Preferred precipitating agents are polar compounds, such as water, acetone, and lower alcohols, such as methanol and ethanol, or mixtures of these precipitating agents. The temperature of the solution and also of the precipitating agent is in a range from 10 to 100° C., preferably between 20 and 90° C. The temperature of the solution and also of the precipitating agent here is below the boiling points of the solvent and precipitating agent.

The preferred thin and porous layers can be employed as filters of small layer thickness which are self supporting, or, to increase the mechanical stability, can also be applied to a carrier or coated with a suitable material. The construction of a larger filter unit, for example by a large number of porous layers, is furthermore possible. Preferably, one or more thin porous layers are used and are employed, for example, in a cylindrical, possibly transparent container. The layers can be fixed mechanically, for example, or applied to a carrier, preferably a coarse-mesh system, for example of metal, polymer or synthetic or naturally occurring fibers, for fixing and at the same time for increasing the mechanical stability.

The absorbent according to the invention is advantageously distinguished by a high capacity for the absorption of various contaminants. It has been demonstrated that the outstanding absorption properties also exist under stress for example under reduced pressure. Another advantage lies in the diverse usefulness of the absorbent according to the invention, which is suitable for absorbing contaminants from solid or liquid surfaces but also for removing contaminants from flowing liquids and gases, for example in the context of a process step.

The diverse usefulness of the absorbent according to the invention becomes clear from the fact that larger cohesive systems and also porous materials can also be produced without the outstanding properties of the powder being lost.

It is an ecological advantage that the cycloolefin copolymer which the absorbent according to the invention comprises is unproblematic in respect of dumping and also combustion. Furthermore, reuse of the absorbent is possible, for example by simple extraction of the contaminants and subsequent drying.

The following examples are intended to illustrate the present invention. The abbreviation—ABT here means absorbent. In all examples, the absorbent comprises an ethylene/norbornene copolymer.

EXAMPLE 1

A solution of a cycloolefin copolymer in toluene is poured into the precipitating agent acetone in a ratio of about 1:10 at room temperature and the mixture is stirred at high speed for about 5 minutes. The concentration of the solution is 8% by weight. After the precipitated product has been filtered off in vacuo (200 mbar), it is dried at 80° C. in vacuo. A cycloolefin copolymer of loose, wadding-like consistency is obtained, 10 g of the machine oil ®Nuto H 46 from Esso were added to 1 g of the resulting cycloolefin copolymer and the absorption of the oil was determined.

Example 1 was carried out with a total of four different cycloolefin copolymers. The results are shown in Table 1.

TABLE 1

| Ex. | Specimen | $Tg/°C.$ | $Tm/°C.$ | $VN/ml\ g^{-1}$ | Bulk density/ $gl^{-1}$ | Absorption g of oil/g of ABT |
|---|---|---|---|---|---|---|
| 1a | COC 1 | 121 | 265 | 165 | 22 | >10:1 |
| 1b | COC 2 | 118 | 268 | 161 | 22 | >10:1 |
| 1c | COC 3 | 127 | 272 | 134 | — | 8:1 |
| 1d | COC 4 | 127 | 276 | 95 | 30 | 8:1 |

EXAMPLE 2

A solution of a cycloolefin copolymer in cyclohexane is added dropwise to the precipitating agent water in a ratio of 1:10 at a rate of about 0.1 l/hour, while stirring vigorously (about 800 revolutions/minute). A helical stirrer (H) and a propeller stirrer (P) are used. The temperature of the precipitating agent is about 96° C. and the polymer solution is at room temperature. The solvent is distilled off continuously during the precipitation. After the precipitated product has seen filtered off in vacuo (200 mbar), it is dried at 70° to 80° C. in vacuo. After the drying, 10 g of the machine oil ®Nuto H 46 from Esso were added to 1 g of the cycloolefin copolymer and the absorption of the oil was determined.

Example 2 was carried out with a total of three different cycloolefin copolymers. The results are shown in Table 2.

TABLE 2

| Ex. | Specimen | Concentration of the polymer solution % by weight | Tg °C. | VN ml/g | Absorption g of oil/g of ABT | Consistency of the ABT |
|---|---|---|---|---|---|---|
| 2a | COC 5 (H) | 8 | 148 | 66 | 10:1 | fine-flaked, partly fibrous |
| 2b | COC 5 (P) | 8 | 148 | 66 | 10:1 | fine-flaked, partly fibrous |
| 2c | COC 6 (H) | 4 | 149 | 126 | 8:1 | fine-flaked, partly fibrous |

EXAMPLE 3

A solution of a cycloolefin copolymer in toluene is sprayed in fine distribution into the precipitating agent water in a ratio of about 1:10 at a rate of about 2 l/hour. The temperature of the precipitating agent is about 96° C. and the polymer solution is at room temperature. Very thorough mixing is achieved by blowing in nitrogen After the precipitated product has been filtered off, it is dried at 70 to 80° C. in vacuo.

After the drying, 10 g of the machine oil ®Nuto H 46 from Esso or 10 g of used oil were added to 1 g of the cycloolefin copolymer and the absorption of the oil was determined.

Example 3 was carried out with a total of five different cycloolefin copolymers. The results are shown in Table 3.

TABLE 3

| | | Concentration of the polymer | | | Absorption of oil g of oil/g of ABT | |
|---|---|---|---|---|---|---|
| Ex. | Specimen | solution % by weight | Tg °C. | VN ml/g | Machine oil | Used oil |
| 3a | COC 5 | 8 | 148 | 66 | 10:1 | 10:1 |
| 3b | COC 6 | 4 | 149 | 126 | 12:1 | 12:1 |
| 3c | COC 7 | 8 | 148 | 63 | 10:1 | 10:1 |
| 3d | COC 8 | 8 | 149 | 85 | 12:1 | 12:1 |
| 3e | COC 9 | 2.5 | 150 | 197 | 12:1 | 12:1 |

EXAMPLE 4

Carrying out the method to determine the absorption capacity 15 g or 20 g of oil (starting weight (SW) of oil) are added to 1 g of a cycloolefin copolymer (starting weight (SW) of COC) and the mixture is stirred and left to stand for 5 minutes. It is then filtered over a pressure suction filter under about 200 mbar and the filtrate [residual oil] and also the filtration residue (final weight (FW) of the mass) are weighed. Differences between the total starting weight and the final weight of the residual oil and the sum of the bonded oil and COC are to be explained by losses during transfer from the vessel to the pressure suction filter.

a) A solution of the cycloolefin copolymer in toluene is added dropwise to the precipitating agent water in a ratio of about 1:10 at a rate of about 0.1 l/hour, while stirring vigorously (about 1000 revolutions/minute). A helical stirrer (H) and a propeller stirrer (P) are used. The concentration of the solution is 9% by weight. The temperature of the precipitating agent is about 96° C. and the polymer solution is at room temperature. The solvent is distilled off continuously during the precipitation. After the precipitated product has been filtered off in vacuo (about 200 mbar), it is dried at 70 to 80° C. in vacuo.

The absorption of oil is tested with the aid of the machine oil ®Nuto H 46 From Esso. Example 4a) is carried out with two different cycloolefin copolymers. The results are shown in Table 4.

TABLE 4

| | COC 5 (H) | COC 5 (P) |
|---|---|---|
| SW COC | 0.97 | 1.06 |
| SW oil | 14.13 | 15.69 |
| Ratio of SW | 14.6 | 14.8 |
| Residual oil | 7.14 | 5.90 |
| FW mass | 7.83 | 9.77 |
| g of bonded oil per g of ABT | 7 | 8.2 | b) The various cycloolefin copolymers COC 5, COC 6, COC 7 and COC 9 were worked up as described in Example 3.

The absorption of oil was tested using the machine oil ®Nuto H 46 from Esso, hydraulic oil ADF 200, used oil and ®Enerpar 1927 from BP. The results are shown in Tables 5, 6, 7 and 8.

TABLE 5

| ABT: COC 5 | Hydraulic oil | Machine oil | Used oil | ® Enerpar 1927 |
|---|---|---|---|---|
| SW COC | 1.02 | 1.1 | 1.04 | 1.04 |
| SW oil | 20.17 | 19.11 | 20.09 | 21.46 |
| Ratio of SW | 19.8 | 17.4 | 19.3 | 20.6 |
| Residual oil | 9.9 | 7.5 | 8.5 | 7.4 |
| FW mass | 8.45 | 9.52 | 8.85 | 11.23 |
| g of bonded oil per g of ABT | 8 | 9 | 9.5 | 12 |

TABLE 6

| ABT: COC 6 | Hydraulic oil | Machine oil | Used oil | ® Enerpar 1927 |
|---|---|---|---|---|
| SW COC | 1.06 | 1.01 | 0.97 | 0.98 |
| SW oil | 20.05 | 19.44 | 20.1 | 20.27 |
| Ratio of SW | 18.9 | 19.24 | 20.7 | 19.3 |
| Residual oil | 8.3 | 8.9 | 5.0 | 5.9 |
| FW mass | 11.71 | 10.06 | 14.0 | 13.02 |
| g of bonded oil per g of ABT | 10 | 9 | 14 | 13.5 |

TABLE 7

| ABT: COC 7 | Hydraulic oil | Machine oil | Used oil | ® Enerpar 1927 |
|---|---|---|---|---|
| SW COC | 1.03 | 1.05 | 1.15 | 1.07 |
| SW oil | 20.26 | 19.57 | 20.3 | 20.59 |
| Ratio of SW | 19.7 | 18.6 | 17.7 | 19.2 |
| Residual oil | 10.6 | 9.2 | 4.3 | 6.4 |
| FW mass | 9.27 | 9.68 | 14.03 | 12.16 |
| g of bonded oil per g of ABT | 9 | 9.2 | 9.5 | 11 |

TABLE 8

| ABT: COC 9 | Hydraulic oil | Machine oil | Used oil | ® Enerpar 1927 |
|---|---|---|---|---|
| SW COC | 1.02 | 1.18 | 1.26 | 1.19 |
| SW oil | 19.12 | 19.6 | 20.04 | 4.22 19.6 |
| Ratio of SW | 18.8 | 16.6 | 15.9 | 16.5 |
| Residual oil | 8.8 | 6.2 | 5.4 | 5.7 |
| FW mass | 10.68 | 13.84 | 14.0 | 14.23 |
| g of bonded oil per g of ABT | 9.5 | 10.7 | 11 | 11 |

EXAMPLE 5 a) A solution of the cycloolefin copolymer in cyclopentane is added dropwise to the precipitating agent water in a ratio of about 1:10 at a rate of about 0.1 l/hour, while stirring vigorously (about 800 revolutions/minute). A propeller stirrer (P) is used. The temperature of the precipitating agent is about 96° C. and the polymer solution is at room temperature. The solvent is distilled off continuously during the precipitation. After the precipitated product has been filtered off in vacuo (about 200 mbar), it is dried at 70 to 80° C. in vacuo. After the drying, 12 g of the machine oil ®Nuto H 46 from Esso were added to 1 g of the cycloolefin copolymer and the absorption of the oil was determined.

Example 5 was carried out with three different cycloolefin copolymers. The results are shown in table 9.

TABLE 9

| Ex. | Specimen | Concentration of the polymer solution % by weight | Tg °C. | VN ml/g | Absorption g of oil/g of ABT | Consistency of the ABT |
|---|---|---|---|---|---|---|
| 9a | COC 5 | 8 | 148 | 66 | 10:1 | fluffy (fine) |
| 9b | COC 6 | 4 | 149 | 126 | 12:1 | fluffy |
| 9c | COC 9 | 2.5 | 150 | 197 | 12:1 | fluffy |

EXAMPLE 6

Following the test instruction "Ölbinderbedarf für Ölbinder Typ I, II und IV" (GMBI 1990) [oil absorbing needs for oil absorber of the typ I, II and IV] 200 ml of water free of ions were given into a 500 ml dropping funnel 5 ml hydraulic oil ADF 200 were added. Afterwards various amounts of COC 8 (Tg=149° C. VN=85 ml/g) were applied. After stirring for 10 minutes, wherein only the layer of oil and the absorbing agent were stirred, the water was let out. Afterwards the amount of oil was determined, which was let out after one hour. From this the amount of oil, which is absorbed on 1 g of ABT is calculated.

The results are shown in table 10.

TABLE 10

| Ex. | weight of oil g | weight of ABT g | Absorption g of oil/g of ABT | remarks |
|---|---|---|---|---|
| 6a | 4.6 | 1.0 | 5:1 | completely absorbed |
| 6b | 4.55 | 0.74 | 6:1 | completely absorbed |
| 6c | 4.46 | 0.51 | 9:1 | completely absorbed |
| 6d | 4.61 | 0.35 | 13:1 | low residue of oil on the glas wall |
| 6e | 9.08 | 0.58 | 15:1 | residue of oil about 0.5 ml |

What is claimed is:

1. A method for absorbing and binding of liquid organic contaminants, said method comprising passing liquid organic contaminants through a filter device comprising a filter unit which has a composition containing at least one cycloolefin copolymer having polymerized units which are derived from at least one cyclic olefin unit having one unsaturated bond (monoene) and at least one acyclic olefin incorporated into said filter unit.

2. The method of claim 1, wherein said composition contains between about 10% and 100% by weight of at least one cycloolefin copolymer.

3. The method of claim 1, wherein said cyclic olefin is polycyclic.

4. The method of claim 1, wherein said cycloolefin copolymer is a norbornene ethylene copolymer.

5. The method of claim 1, wherein said cycloolefin copolymer contains polymerized units which are derived from at least one polycyclic olefin, at least one acyclic olefin, and at least one polycylic diene.

6. The method of claim 5, wherein said polycyclic diene is norbornadiene or 2-vinylnorbornene.

7. The method of claim 6, wherein said cycloolefin copolymer is norbornene norbornadiene ethylene terpolymer or norbornene 2-vinylnorbornene ethylene terpolymer.

8. The method of claim 1, wherein said cycloolefin copolymer has a glass transition temperature ($T_g$) of between about 100 and about 250° C.

9. The method of claim 1, wherein said cycloolefin copolymer has a viscosity number of between about 60 cm$^3$/g and about 200 cm$^3$/g.

10. The method of claim 1, wherein said composition is in the shape of particles, mats, or layers.

11. A method for absorbing and binding of liquid organic contaminants, said method comprising passing liquid organic contaminants through a filter device comprising a filter unit which has a composition containing from 10 to 100% by weight of at least one cycloolefin copolymer incorporated into said filter unit and said at least one cycloolefin copolymer contains at least 30 to 99% by weight of one or more polycyclic olefins based on the total weight of the cycloolefin copolymer and 0.1 to 99% by weight, based on the total weight of the cycloolefin copolymer polymerized units which are derived from one or more acyclic olefins of the formula VII (VII)

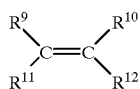

in which $R^9$, $R^{10}$, $R^{11}$ and $R^{12}$ are identical or different and are a hydrogen atom or a $C_1$–$C_{20}$-hydrocarbon radical.

12. The method of claim 11, wherein the polycyclic olefins are of the formulas I, II, III, IV, V or VI

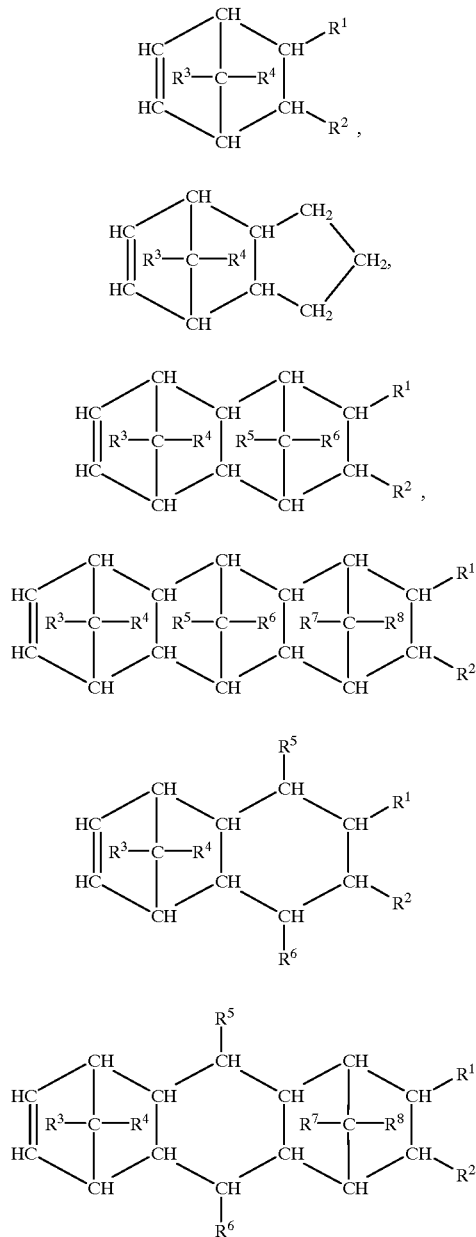

in which $R^1$, $R^2$, $R^3$, $R^4$, $R^5$, $R^6$, $R^7$ and $R^8$ are identical or different and are a hydrogen atom or a $C_1$–$C_{20}$-hydrocarbon radical, or form a ring where the same radicals $R^1$ to $R^8$ in the various formula I to VI can have different meanings.

13. The method of claim 12, wherein the cycloolefin copolymer is present in an amount from 50 to 100% by weight and 60 to 99% by weight of the total weight of the cycloolefin copolymer are derived from one or more polycyclic olefins of the formula I, II, III, IV, V or VI.

14. The method of claim 13, which further comprises from 0.1 to 99% by weight based on the total weight of the cycloolefin copolymer, of polymerized units which are derived from one or more monocyclic olefins of the formula VIII

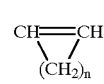

(VIII)

in which n is a number from 2 to 10.

15. The method of claim 13, wherein the cycloolefin copolymer is present in an amount from 90 to 100% by weight and the polycyclic olefin is norbornene, tetracyclododecene or norbornadine and the acyclic olefin of the formula VII is ethylene or propylene.

16. The method of claim 15, wherein the polycyclic olefin is norbornene and the acyclic olefin is ethylene.

17. A method for absorbing and binding of liquid organic contaminants, said method comprising passing liquid organic contaminants through a filter device comprising a filter unit which has a terpolymer composition incorporated into said filter unit, said terpolymer contains 20 to 95% by weight of at least polycyclic monoolefin, 0.1 to 99% by weight of an acyclic monoolefin and up to 50% by weight of polymerized units which are derived from a polyene incorporated into said filter unit.

18. The method of claim 17, wherein the content of a polycyclic monoolefin is from 40 to 90% by weight and the acyclic monoolefin is present in an amount from 10 to 60% by weight and the polyene is present in an amount up to at most 20% by weight.

19. The method of claim 18, wherein the terpolymer is norbenene/vinylnorbornene/ethylene, norbornene/norbornadiene/ethylene, tetracyclododecene/vinylnorbornene/ethylene or tetracyclododecene/vinyltetracyclododecene/ethylene.

* * * * *